United States Patent [19]

Yoshigai

[11] 4,263,990
[45] Apr. 28, 1981

[54] CALIPER BRAKE APPARATUS OF THE SIDE-PULL TYPE

[75] Inventor: Toshiharu Yoshigai, Higashi-Osaka, Japan

[73] Assignee: Yoshigai Kikai Kinzoku Kabushiki Kaisha, Osaka, Japan

[21] Appl. No.: 21,477

[22] Filed: Mar. 19, 1979

[30] Foreign Application Priority Data

Mar. 23, 1978 [JP] Japan ................................. 53-34479
Mar. 23, 1978 [JP] Japan ................................. 53-34480
Sep. 13, 1978 [JP] Japan ............................ 53-126361[U]

[51] Int. Cl.³ .............................................. B62L 1/12
[52] U.S. Cl. .................................................. 188/24
[58] Field of Search ......................... 188/2 D, 24, 27; 74/10.85, 89.14, 89.15, 98, 424.8 R, 425

[56] References Cited

U.S. PATENT DOCUMENTS

| 2,016,854 | 10/1935 | Cramer | 74/10.85 |
|---|---|---|---|
| 2,101,830 | 12/1937 | Babcock | 74/424.8 R |
| 2,329,871 | 9/1943 | Briggs et al. | 74/424.8 R |
| 2,990,567 | 7/1961 | Pearson | 74/425 |
| 4,015,690 | 4/1977 | Armstrong | 188/24 |
| 4,064,972 | 12/1977 | Ohtani et al. | 188/27 |

FOREIGN PATENT DOCUMENTS 2556568  6/1977  Fed. Rep. of Germany ............ 188/24

*Primary Examiner*—Edward R. Kazenske
*Attorney, Agent, or Firm*—Koda & Androlia

[57] ABSTRACT

In a brake apparatus for a bicycle including a pair of brake arms each having a brake shoe and turnably mounted on a center bolt, and a brake spring for biasing the shoes away from each other, a center adjusting device comprising a retainer supported on the center bolt turnably relative to the bolt for retaining the brake spring, a holder mounted on the bolt immovably about the axis of the bolt and an adjusting member supported by the holder and associated with the spring retainer. The adjusting member is positioned on one side of the center bolt as displaced laterally outward from the frame of the bicycle and thereby rendered easily operable to effect accurate adjustment.

1 Claim, 16 Drawing Figures

Fig. 3
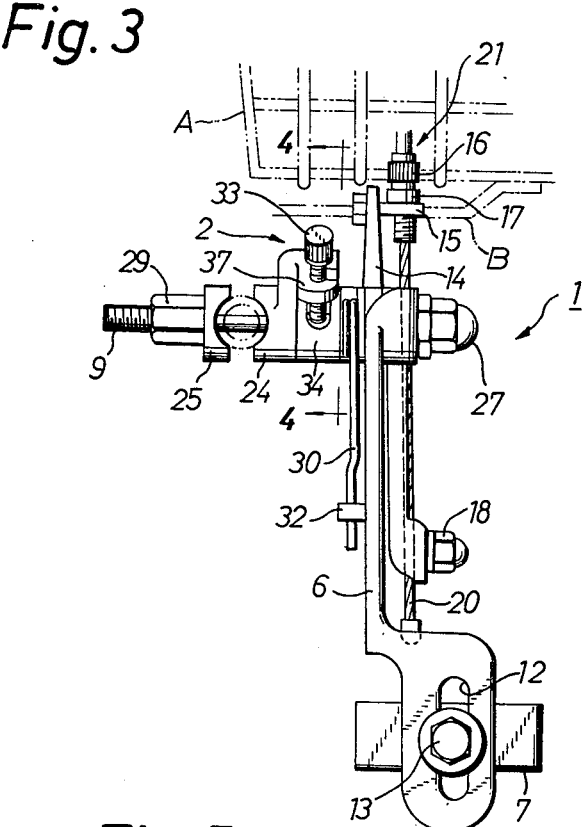
Fig. 5
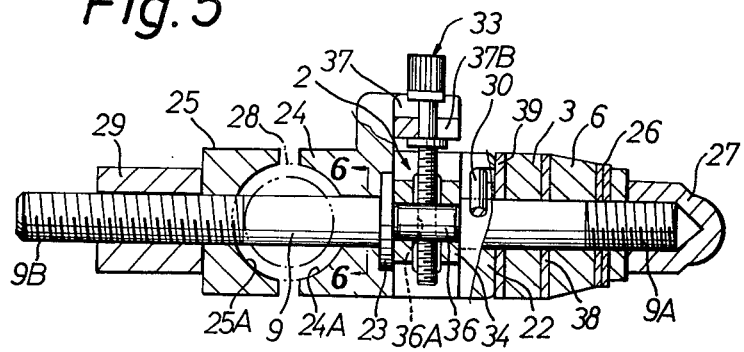
Fig. 6 (1)   Fig. 6 (2)
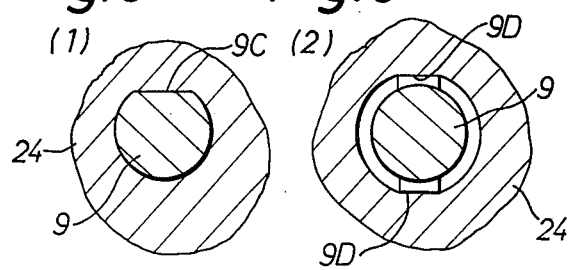

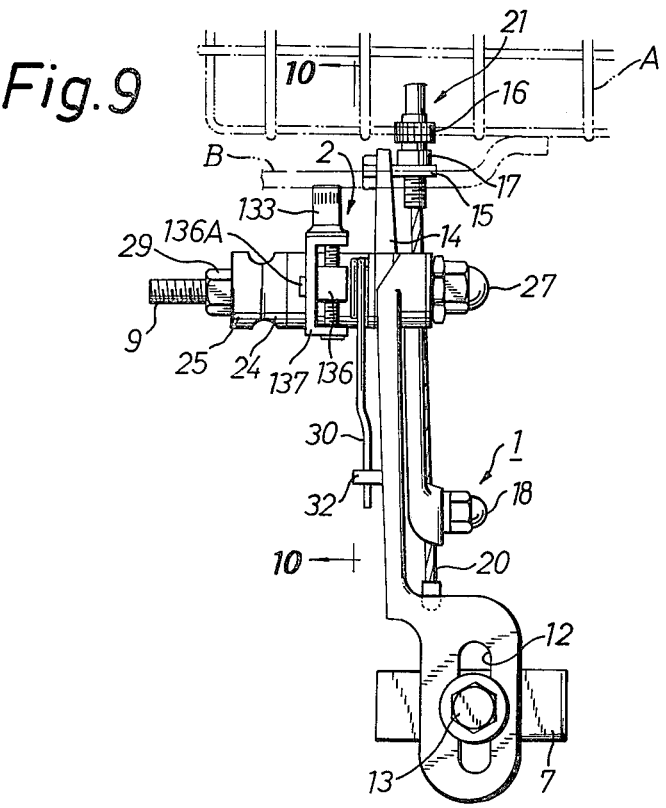
Fig.9
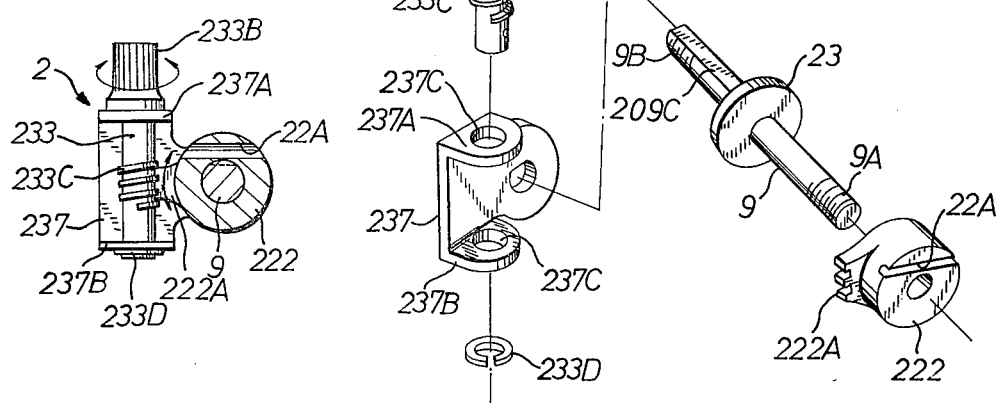
Fig.14
Fig.15

CALIPER BRAKE APPARATUS OF THE SIDE-PULL TYPE

BACKGROUND OF THE INVENTION

The present invention relates to caliper brake apparatus of the side-pull type for bicycles, and more particularly to center adjusting devices for such brake apparatus.

Brake apparatus of this type are widely used in bicycles. With caliper brake apparatus for bicycles, the shoes attached to the distal ends of opposed brake arms wear away varying amounts during years of use. Such wear takes place invariably unevenly. Especially in the case of side-pull type, uneven wear occurs very markedly, producing a difference in the shoe-to-rim clearance between the opposite sides of the wheel rim, with the result that the brake fails to operate properly on one side. This is likely to cause a serious accident.

Accordingly when a difference in the shoe-to-rim clearance occurs between opposite sides of the wheel, there arises the necessity of properly adjusting the clearance, but the adjustment requires a cumbersome procedure, needs much skill and is therefore difficult to make accurately.

Stated more specifically, conventional caliper brake apparatus comprise a pair of brake arms each carrying a brake shoe and turnably supported on a center bolt attached to the bicycle frame. A brake spring for biasing the opposed shoes away from each other is held by a retainer which is also attached to the bolt. For the adjustment of the brake apparatus, the center bolt is loosened from the frame first, and the distance between the rim and the shoes is properly adjusted by turning the brake arms and the center bolt about the axis of the bolt. The center bolt is thereafter tightened up.

The adjusting procedure is apparently cumbersome since it is necessary to loosen the brake apparatus from the frame first. The distance to which the shoes are adjusted relative to the rim is determined predominantly by empirical skill and is therefore inaccurate and is liable to alter when the bolt is tightened up again after the adjustment owing to the resulting torque.

Further even when the brake shoes have not been worn out unevenly, it is essential that the pair of brake shoes be spaced at the same distance from the rim, whereas it is difficult to properly mount the brake apparatus on the frame by fastening for the same reason as stated above.

SUMMARY OF THE INVENTION

An object of the present invention is to provide a center adjusting device for caliper brake apparatus of the side-pull type comprising a spring retainer supported on a center bolt turnably relative to the bolt, a holder immovable about the axis of the center bolt and an adjusting member held by the holder and associated with the spring retainer, the adjusting member being positioned on one side of the center bolt laterally of the vehicle body and thereby rendered easily operable to effect accurate and fine adjustment.

Another object of this invention is to provide a center adjusting device which can be designed with freedom for use in bicycles which may be provided with a luggage carrier, container or the like, without being limited by such equipment.

Another object of this invention is to provide a center adjusting device for a brake apparatus which comprises a brake spring retainer mounted on a center bolt turnably relative to the bolt and an adjusting member adapted to turn the retainer and mounted on an annular mount for attaching the brake apparatus to a vehicle body, the brake apparatus thus being made adjustable by the device simply with a slight modification of the annular mount.

Another object of this invention is to provide a device which comprises a holder immovable about the axis of a center bolt for holding an adjusting member and a brake spring retainer mounted on the center bolt turnably relative to the bolt about its axis and in which the operating torque about the axis of the adjusting member and given thereto is transmitted through ball joint means or screw-thread means to the spring retainer to turn the retainer so that the adjusting force can be transmitted accurately and smoothly.

Still another object of this invention is to provide a center adjusting device for a brake apparatus by which the brake apparatus as mounted on a vehicle body in its fastened position is adjustable smoothly and readily by any one with the use of an adjusting member.

BRIEF DESCRIPTION OF THE DRAWINGS

FIG. 3 is a side elevation showing the brake;

FIG. 5 is an enlarged view in section of a portion of FIG. 3;

FIGS. 6 (1) and (2) are enlarged views in section taken along the line 6—6 in FIG. 5 and showing two examples;

FIG. 9 is a side elevation showing the same;

FIG. 13 is a side elevation of the same;

FIG. 14 is an enlarged view taken along the line 14—14 in FIG. 13; and

FIG. 15 is a partly exploded perspective view of the same.

DESCRIPTION OF THE PREFERRED EMBODIMENTS

Figure 1:
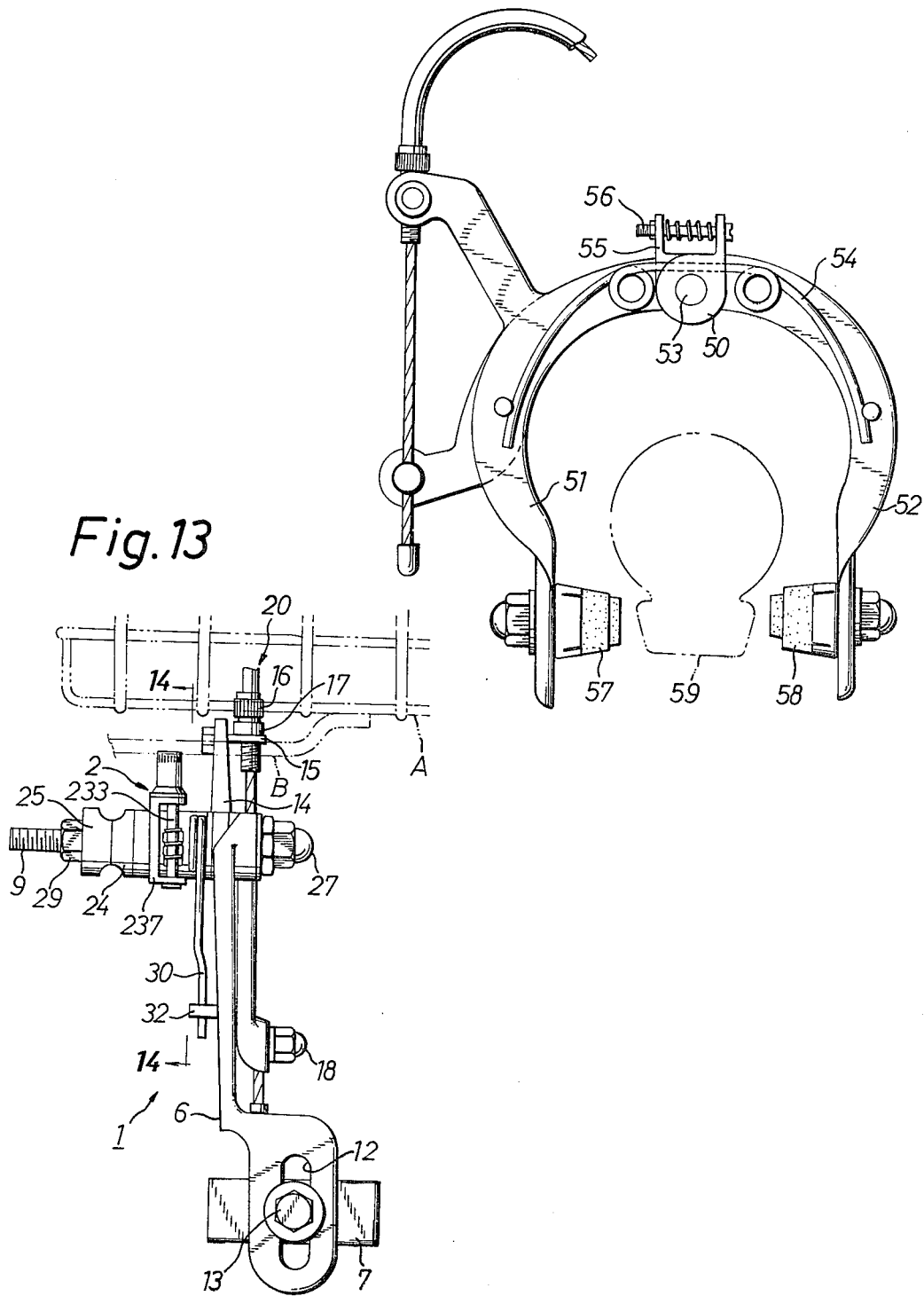
FIG. 1 is a rear view showing a conventional caliper brake apparatus of the side-pull type equipped with a center adjusting device.

Throughout the drawings, like parts are referred to by like reference numerals.

Figure 2:
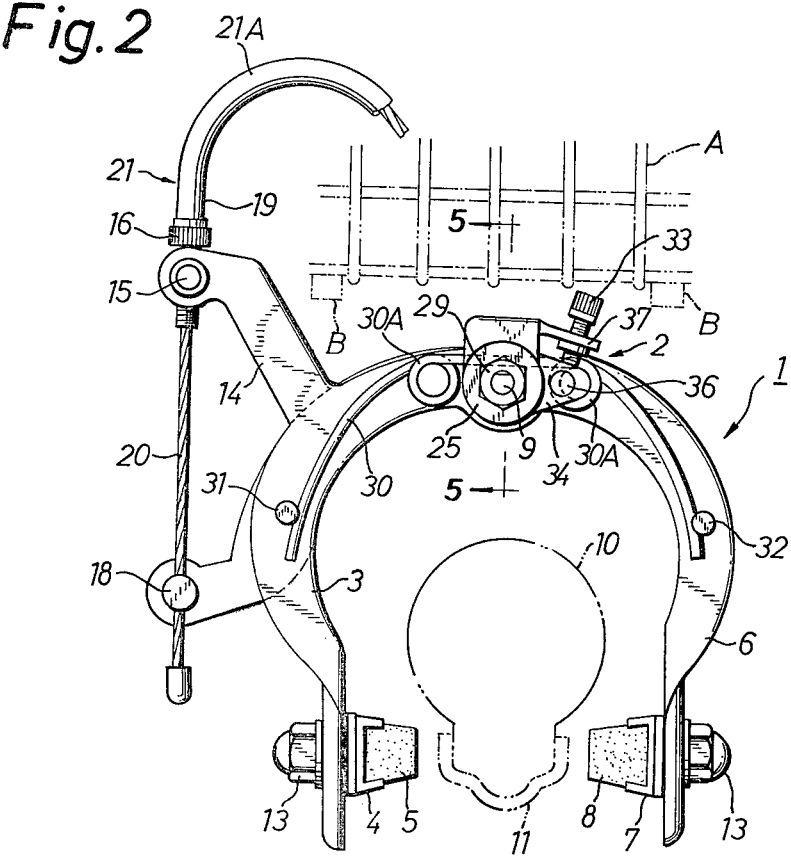
FIG. 2 is a rear view showing a caliper brake of the side-pull type equipped with the most suitable center adjusting device according to this invention.

With reference to FIGS. 2 and 3, a caliper brake apparatus 1 is rigidly attached to the front or rear fork of a bicycle by screw fastening means. The brake apparatus is equipped with a center adjusting device 2. A first brake arm 3, called a small arch or Y-arch, has a brake shoe 5 attached to its one end by a holder 4. A second brake arm 6, called a large arch or C-arch, carries a brake shoe 8 attached to its one end by a holder 7.

The other end of the first brake arm 3 and an intermediate portion of the second brake arm 6 are lapped over each other and mounted turnably on a center bolt 9 with the brake shoes 5 and 8 opposed to opposite sides of the rim 11 of a wheel 10.

The brake shoes 5 and 8 are each in the form of a wear-resistant rubber block and adjustable in position radially of the wheel 10 within the range of a guide slot 12 shown in FIG. 3 when a bolt 13 is loosened.

A branch arm 14 extending from an intermediate portion of the first brake arm 3 is provided with a connector at its forward end.

An outer holder 16 in the form of a threaded tube is screwed in the connector 15 and provided with a threaded adjusting piece 17. An inner wire connector 18 is detachably attached to the other end of the second brake arm 6.

A brake wire 21 comprises an outer wire 19 and an inner wire 20. The outer wire 19 is held by the outer holder 16, while the inner wire 20 extends through the outer holder 16 and is attached to the connector 18 on the second brake arm 6.

The brake wire 21 is coupled to a brake operating lever mounted on the handle of the bicycle. The wire 21 includes a curved portion as indicated at 21A in FIG. 1.

Figure 4:
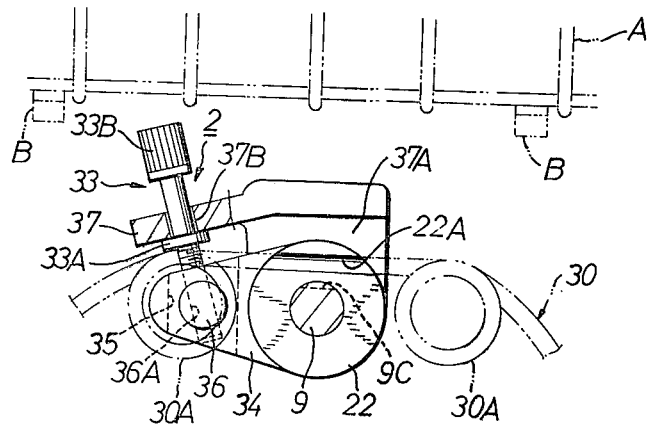
FIG. 4 is an enlarged view in section taken along the line 4—4 in FIG. 3.
Figure 12:
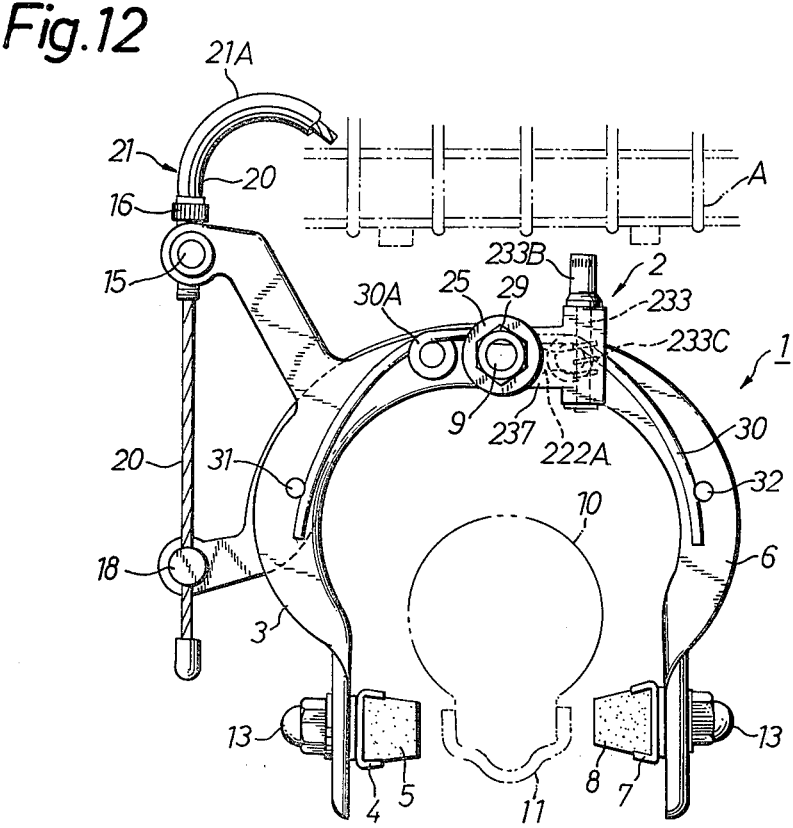
FIG. 12 is a rear view showing another embodiment of the invention.

A spring retainer 22 is cylindrical and is mounted on the center bolt 9 turnably relative to the bolt about the axis of the bolt. As shown in FIG. 4, the retainer 22 is laterally cut out in its one end face to provide a retaining portion 22A.

With reference to FIG. 5, the center bolt 9 is integrally formed with a separating flange 23 at an axially intermediate portion thereof. One-half portion of the bolt 9 to the front of the flange 23 rotatably supports the brake arms 3 and 6 and spring retainer 22. The rear half of the center bolt 9 carries a pair of annular mounts 24 and 25. The portions of the annular mounts 24 and 25 opposed to each other are inwardly curved and recessed to provide seats 24A and 25A.

The center bolt 9 is threaded as at 9A and 9B at the front and rear half portions. A cap nut 27 is screwed on the threaded portion 9A with washers 26 interposed between the second brake arm 6 and the nut 27. With a frame 28 of the bicycle clamped between the seats 24A, 25A of the pair of annular mounts 24, 25, a nut 29 is screwed on the threaded portion 9B, whereby the center bolt 9 is rigidly attached to the frame 28.

A brake spring 30 is in the form of an arch in its entirety and has coiled portions 30A at opposite shoulders of the arch. The midportion of the spring 30 between the coiled portions 30A is fitted in the retaining portion 22A of the retainer 22. The spring 30 extends downward toward its opposite ends, which engage from inside pins 31 and 32 projecting from the rear faces of the brake arms 3 and 6 respectively and arranged symmetrically with respect to the center bolt as seen in FIG. 2. Thus the spring 30 biases the brake arms 3 and 6 away from each other about the axis of the center bolt 9 to urge the brake shoes 5 and 8 away from each other.

According to the most preferred embodiment of this invention shown in FIGS. 2 to 6, the center adjusting device 2 comprises an adjusting member 33 associated with the spring retainer 22 and with the annular mount 24 by screw-thread means.

With reference to FIGS. 4 and 5, a projecting arm 34 integral with the spring retainer 22 extends radially outward with respect to the center bolt 9 and also laterally of the bicycle body. The arm 34 is tapered toward the direction of extension as seen in FIG. 4.

The projecting arm 34 has a bore 35 extending vertically therethrough. An internally threaded member 36 accommodated in the arm 34 extends across the bore 35. The internally threaded member 36 is in the form of a solid cylinder positioned in parallel to the axis of the center bolt 9. At an intermediate portion of the cylinder, the member 36 has an internally threaded portion 36A extending diametrically therethrough. The internally threaded member 36 is detachably mountable and turnable about its axis.

A holder 37 for holding the adjusting member 33 is integral with the first annular mount 24. As illustrated in FIGS. 4 and 5, the holder 37 includes an upright portion 37A which extends slantingly downward so as to oppose the arm 34 thereabove. The front edge of the extension has a cutout 37B.

The adjusting member 33 comprises a threaded bolt having a head 33B and a flange 33A at an axially intermediate portion and screwed into the threaded portion 36A of the internally threaded member 36. The adjusting member 33 is engaged in the cutout 37B with its flange 33A bearing against the bottom face of the holder 37. Thus the center adjusting device 2 is positioned on one side of the center bolt 9 laterally of the bicycle frame. Preferably the device 2 is situated on the opposite side of the center bolt relative to the brake wire 21 as shown in FIG. 2.

The first annular mount 24 coacting with the second annular mount 25 is fastened to the frame 28 by the nut 29 and immovable about the axis of the center bolt 9. According to a preferred embodiment of this invention, the center bolt 9 is partly formed with a longitudinally continuous planar face 9C which is adapted to fit to the first mount 24 to render the annular mount 24 immovable about the axis of the bolt 9 as shown in FIG. 6 (1). According to the example shown in FIG. 6 (2), the center bolt 9 is formed, in the vicinity of its separating flange 23, with a suitable number of projecting planar portions 9D fittable to the annular mount 24, thereby making the mount 24 immovable about the axis. The adjusting member 33, when rotated about its axis, turns the spring retainer 22 about the center bolt 9.

Figure 7:
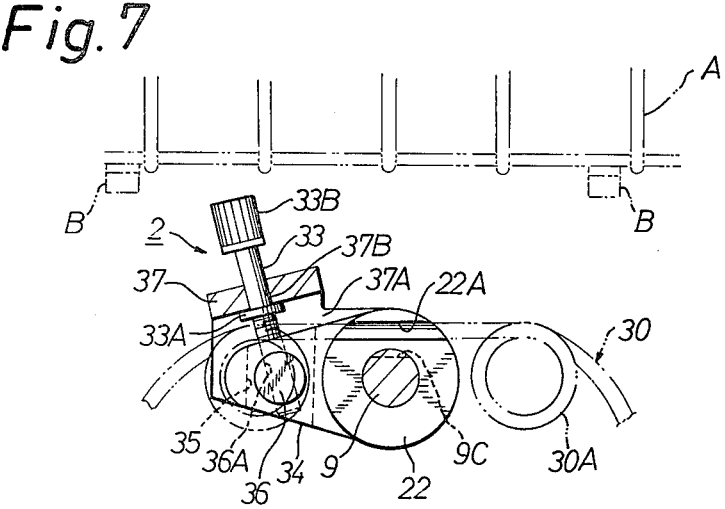
FIG. 7 is a fragmentary sectional view corresponding to FIG. 4 and showing another embodiment of the invention.
Figure 8:
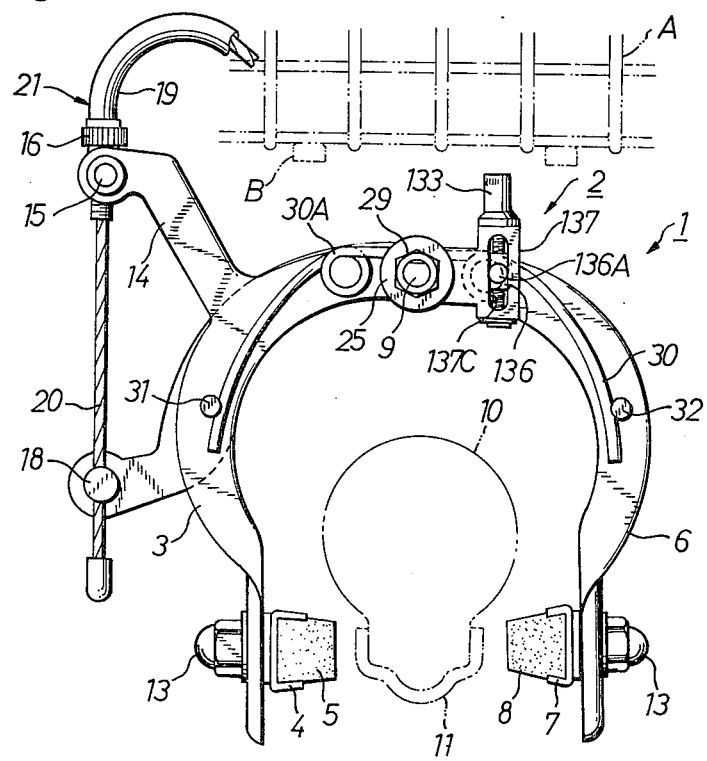
FIG. 8 is a rear view corresponding to FIG. 2 and showing another embodiment of the invention.
Figure 10:
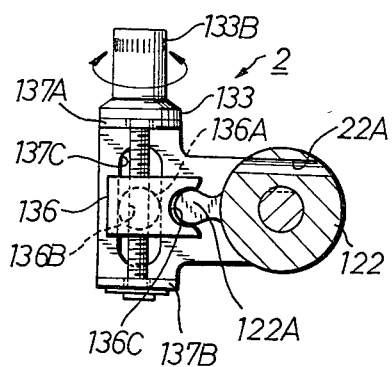
FIG. 10 is a view in section taken along the line 10—10 in FIG. 9.
Figure 11:
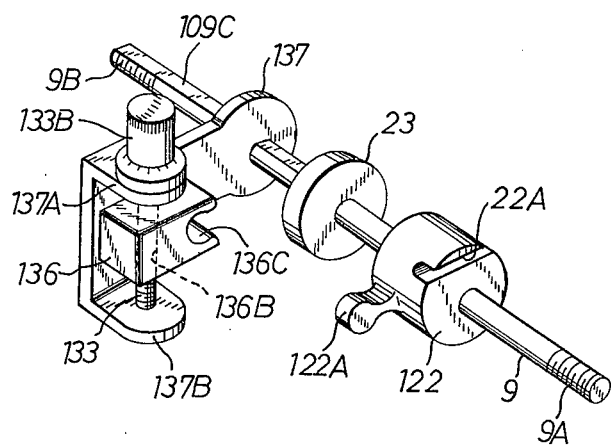
FIG. 11 is a partly exploded perspective view showing the same.

FIG. 7 shows another embodiment which has the same construction as shown in FIG. 4 except that the upright portion 37A included in the holder 37 of FIG. 4 is made to extend directly laterally of the bicycle frame. When the frame 28 is provided with a luggage carrier, basket or the like attached by stays B and indicated at A, the laterally extending upright portion 37A shown in FIG. 7 gives greater freedom of design to the device vertically thereof.

FIG. 5 further shows a washer 38 provided between the brake arms 3 and 6, and another washer 39 interposed between the brake arm 3 and the spring retainer 22. Although not shown, a bush may be fitted around the spring retainer 22 to render the retainer smoothly turnable.

FIGS. 8 to 11 show another embodiment of the second type according to this invention. Since the brake apparatus 1 for which the center adjusting device of this embodiment is used is the same as the one already described, the adjusting device alone will be described.

A holder 137 for holding an adjusting member 133 is supported on the center bolt 9 immovably about its axis as positioned between the first annular mount 24 and the separating flange 23. With this embodiment, the holder 137 is supported by the bolt at its planar engaging portion 109C and extends outward laterally of the vehicle body.

The extending end of the holder 137 has a holding portion including upper and lower flanges 137A and 137B in a pair. The holding portion includes a web formed with a guide aperture 137C which extends vertically. An internally threaded member 136 in the form of a square to rectangular block has a pin 136A engaging in the guide aperture 137C, an internally threaded portion 136B extending therethrough, and a ball seat 136C opposed to the center bolt 9. The adjusting member 133 has a head 133B seated on the flange 137A and includes a threaded stem loosely extending through the flanges 137A and 137B and in screw-thread engagement with the portion 136B of the threaded member 136.

On the other hand, a spring retainer 122 mounted on the center bolt 9 turnably relative thereto is integral with a ball portion 122A projecting laterally of the bicycle body. The ball portion 122A is engaged in the ball seat 136C in spherical face-to-face contact with each other. The adjusting member 133, when rotated about its axis, turns the spring retainer 122 on the center bolt 9.

The embodiment of the second type shown in FIGS. 8 to 11 is also positioned on one side of the center bolt 9 laterally of the bicycle frame, and the adjusting member 133 is turnable about a vertical axis for operation.

FIGS. 12 to 15 show a center adjusting device according to a third embodiment of this invention to be used for the same brake apparatus 1 as already described.

A holder 237 for holding an adjusting member 233 has a circular base portion as in the second embodiment, is clamped between the first annular mount 24 and the separating flange 23 and immovably supported on the center bolt 9, with a planar engaging face 209C of the bolt 9 in engagement with the circular base portion.

The holder 237 has a channel-shaped holding portion including upper and lower flanges 237A and 237B. The adjusting member 233 includes a screw 233C loosely extending through holes 237C formed in the flanges 237A and 237B. With the head 233B of the member 233 resting on the upper flange 237A, a washer 233D is attached to the screw 233C. On the other hand, a spring retainer 222 is integral with an arcuate rack 222A meshable with the screw 233C. The adjusting member 233, when turned about its axis, turns the spring retainer 222 about the center bolt 9.

The present invention described above is useful when the brake shoes 5 and 8 have worn away unevenly, rendering the brake apparatus operable properly only on one side of the wheel. With the first embodiment, the head 33B of the adjusting member 33 is turned about its axis with the tool or hand gripping the head from one side of the frame opposite to the brake wire 21. Since the adjusting member 33 is in engagement with the holder 37 which is immovable about the center bolt 9 while it is screwed in the internally threaded member 36 on the spring retainer 22 which is turnable about the center bolt 9, the advance of the adjusting member 33 turns the retainer 22 about the bolt 9, thus turning the brake arms 3 and 6 in any desired direction, leftward or rightward. The clearance between the brake shoes 5 and 8 and the rim 11 can be adjusted to a proper distance, therefore. Preferably the brake is adjusted by turning the adjusting member 33 in either direction to bring the unevenly worn shoe 5 or 8 into contact with the rim 11 first, thereafter gripping the brake operating lever to bring the other brake shoe 8 or 5 into contact with the rim, and releasing the lever. The restoring force of the brake spring 30 moves the pair of the brake shoes 5 and 8 away from the rim 11 by equal distances.

In this way the brake apparatus can be centered without the necessity of loosening the center bolt 9. A new brake apparatus 1 can be installed on the frame 28 similarly by rigidly fastening the brake apparatus 1 with the center bolt 9 and operating the adjusting member 33 to position the brake shoes 5 and 8 at a proper distance from the rim 11. This is advantageous in that the brake apparatus can be mounted in place without using utmost care and sophisticated skill.

Since the holder 37 is integral with the first annular mount 24 according to the first embodiment, the adjusting member 33 can be supported by the member which is indispensable to the support of the brake apparatus 1 on the frame 28. This serves to reduce the number of the parts. The arm 34 projecting from the spring retainer 22, when turned by the movement of the adjusting member 33, will not twist or otherwise damage the adjusting member 33 since the internally threaded member 36 rotates about its axis.

With the second embodiment of this invention shown in FIGS. 8 to 11, the brake apparatus can be centered similarly by turning the adjusting member 133 about its axis in either direction. With the pin 136A engaging in the guide aperture 137C, the internally threaded member 136 is moved straight upward or downward along the guide aperture 137C by the turn of the member 133. Since the ball portion 122A integral with the spring retainer 122 is in engagement with the ball seat 136C of the threaded member 136, this movement turns the retainer 122 about the center bolt 9 without causing any twist to the ball joint portion, consequently turning the brake arms 3 and 6 either leftward or rightward to adjust the center in the same manner as in the first embodiment. The brake apparatus 1 is conveniently adjustable by bringing the unevenly worn one of the shoes 5 or 8 into contact with the rim 11, gripping the brake operating lever and thereafter releasing the lever to permit the brake spring 30 to move the brake shoes 5 and 8 away from the rim 11 by equal distances.

The third embodiment shown in FIGS. 12 to 15 operates for the adjustment of the brake apparatus 1 substantially in the same manner as the first and second embodiment described except that the turn of the adjusting member 233 is delivered to the spring retainer 222 by means of the screw 233C and the rack 222A. The turn of the adjusting member 233 therefore makes a greater degree of adjustment.

For a better understanding of the advantages of this invention described above, the invention will be described below in comparison with the conventional device shown in FIG. 1. The caliper brake apparatus shown in FIG. 1 includes a mounting rod 53 having a fixed flange 50 at an intermediate portion thereof, supporting a pair of brake arms 51 and 52 on its front half and having a rear half portion to be attached to the frame of a bicycle. A return spring 54 having opposite ends in engagement with the pair of brake arms 51 and 52 is supported by a support ring 55 turnably mounted on the rod 53. The support ring 55 is turnably fastened to the fixed flange 50 by an adjusting screw 56 associated with the support ring 55 and the fixed flange 50.

When one of brake shoes 57 and 58 has been worn away unevenly relative to the other, the support ring 55 is turnable clockwise or counterclockwise about the mounting rod 53 by rotating the adjusting screw 56 to properly adjust the distances between a rim 59 and the pair of brake shoes 57 and 58 without the necessity of loosening the mounting rod 53 from the frame. In this respect, the conventional device resembles the device of this invention. However since the adjusting screw 56 is positioned immediately above the mounting rod 53 transversely of the axis of the rod 53, the adjusting screw 56 has a limited space for manipulation and is therefore difficult to operate because of its position relative to the luggage carrier, lamp and like part attached to the frame although such equipment is not shown in FIG. 1. Additionally there is a limitation on the design of the device in that the adjusting screw 56 must be located as close as possible to the mounting rod 53 so as to avoid the possible interference with the equipment. The conventional device has another drawback that the adjusting screw 56 is not adapted for fine adjustment and is subject to twisting.

In contrast, a sufficient space is available for the adjusting member 33, 133 or 233 of this invention for the manipulation thereof even when the frame is equipped with a container A or the like because the center adjusting device 2 is positioned outward from the center bolt 9 laterally of the frame.

Further according to the present invention in which the center adjusting device 2 is disposed as displaced outward from the center bolt 9 laterally of the frame, the displacement is freely settable and renders the device operable free of interference as with the container A even if the displacement is large. This assures the proper transmission of torque with use of the ball joint means 122A and 136C involving no likelihood of twisting as in the second embodiment, or with use of the screw means 233C and 222A as in the third embodiment.

What is claimed is:

1. In a caliper brake apparatus of the side-pull type for a bicycle including a first brake arm and a second brake arm mounted on and rotatable about a center bolt fixedly clamped to the frame of the bicycle by means of an annular mount having an inwardly recessed seat, each arm having a brake shoe movable into or out of contact with the rim of a wheel of the bicycle, and a brake spring biasing the shoes on the arms away from each other, the brake arms being adapted to receive at one side thereof an operating force from an operating lever, the improvement comprising a brake spring retainer supported on the center bolt said spring retainer being rotatable relative to the bolt and having a first arm portion, an adjusting member holder being integral with the center bolt annular mount and having a second arm portion positioned above the first arm portion in opposed relation thereto, the first and second arm portions extending laterally outwardly of the frame on the side of the center bolt opposite the side receiving the operating force, and a center adjusting device comprising an externally threaded adjusting member and an internally threaded pivoting member in screw-thread engagement therewith and operatively connecting the first and second arm portions together, the externally threaded adjusting member having a threaded portion at one end thereof, a head portion at the other end thereof and a flange portion intermediate the ends, the second arm portion having a cut out aperture provided in a generally horizontal region thereof, said adjusting member extending through said aperture with said flange portion bearing against a bottom face of said second arm portion, the first arm portion being provided with a generally vertically oriented clearance bore extending therethrough, the threaded pivoting member being pivotably mounted in the clearance bore about an axis parallel to the center bolt axis, the threaded portion of the adjusting member and the clearance bore being radially spaced from one another to avoid interference therebetween when the threaded adjusting and pivoting members are threadedly engaged to one another and the pivoting member starts to pivot about its axis as the angle between the first and second arm portions is altered in response to the screw-wise rotation of said adjusting member, so that the adjusting device may be operated by turning the head portion of the adjusting member to thereby vary the angular orientation of the brake spring by rotating the first arm portion of the brake spring retainer relative to the second arm portion of the adjusting member holder thereby causing the brake spring to adjust the orientation of the brake arms and brake shoes relative to the bicycle frame and wheel rim respectively without subjecting the adjusting mechanism to torsional stress.

* * * * *